(12) United States Patent
Thomas et al.

(10) Patent No.: US 8,619,894 B1
(45) Date of Patent: Dec. 31, 2013

(54) METHODS AND APPARATUS FOR BEAMFORMING

(75) Inventors: Timothy A. Thomas, Palatine, IL (US);
Frederick Vook, Schaumburg, IL (US);
Eugene Visotsky, Buffalo Grove, IL (US)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/586,284

(22) Filed: Aug. 15, 2012

(51) Int. Cl.
*H05B 7/02* (2006.01)
*H04L 1/02* (2006.01)

(52) U.S. Cl.
USPC .......................................... 375/267; 375/261

(58) Field of Classification Search
USPC ....................................................... 375/267
See application file for complete search history.

(56) References Cited

U.S. PATENT DOCUMENTS

| | | | |
|---|---|---|---|
| 2011/0064156 A1* | 3/2011 | Kim et al. | 375/267 |
| 2012/0039251 A1* | 2/2012 | Sayana et al. | 370/328 |
| 2012/0140801 A1* | 6/2012 | Asplund et al. | 375/219 |
| 2012/0314792 A1* | 12/2012 | Tesanovic et al. | 375/267 |
| 2013/0003789 A1* | 1/2013 | Eom et al. | 375/219 |
| 2013/0058205 A1* | 3/2013 | Tang | 370/203 |
| 2013/0182794 A1* | 7/2013 | Ringstrom et al. | 375/297 |

* cited by examiner

*Primary Examiner* — Erin File
(74) *Attorney, Agent, or Firm* — Harrington & Smith

(57) ABSTRACT

Systems and techniques for beamforming are disclosed. Codebook antenna ports, such as ports defined by the 8 transmit antenna LTE codebook, are mapped to sub-elements of an antenna array arranged to form a plurality of elevation and azimuth ports, such as 4 elevation and 2 azimuth ports or 2 elevation and 4 azimuth ports. The mapping is chosen so as to optimize performance. Phasing values may also be applied to signal components provided as inputs to the sub-elements, with the values chosen to maximize performance, such as rank 1 gain or rank 2 or higher performance.

21 Claims, 15 Drawing Sheets

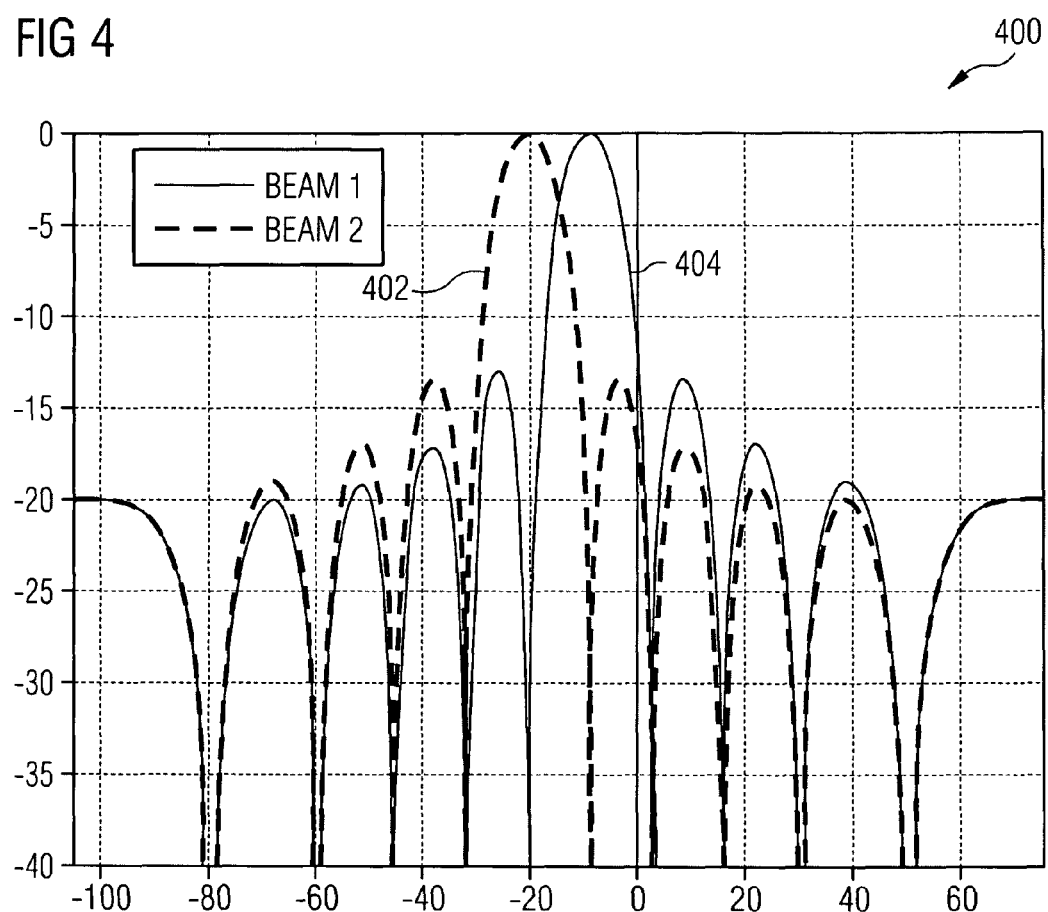

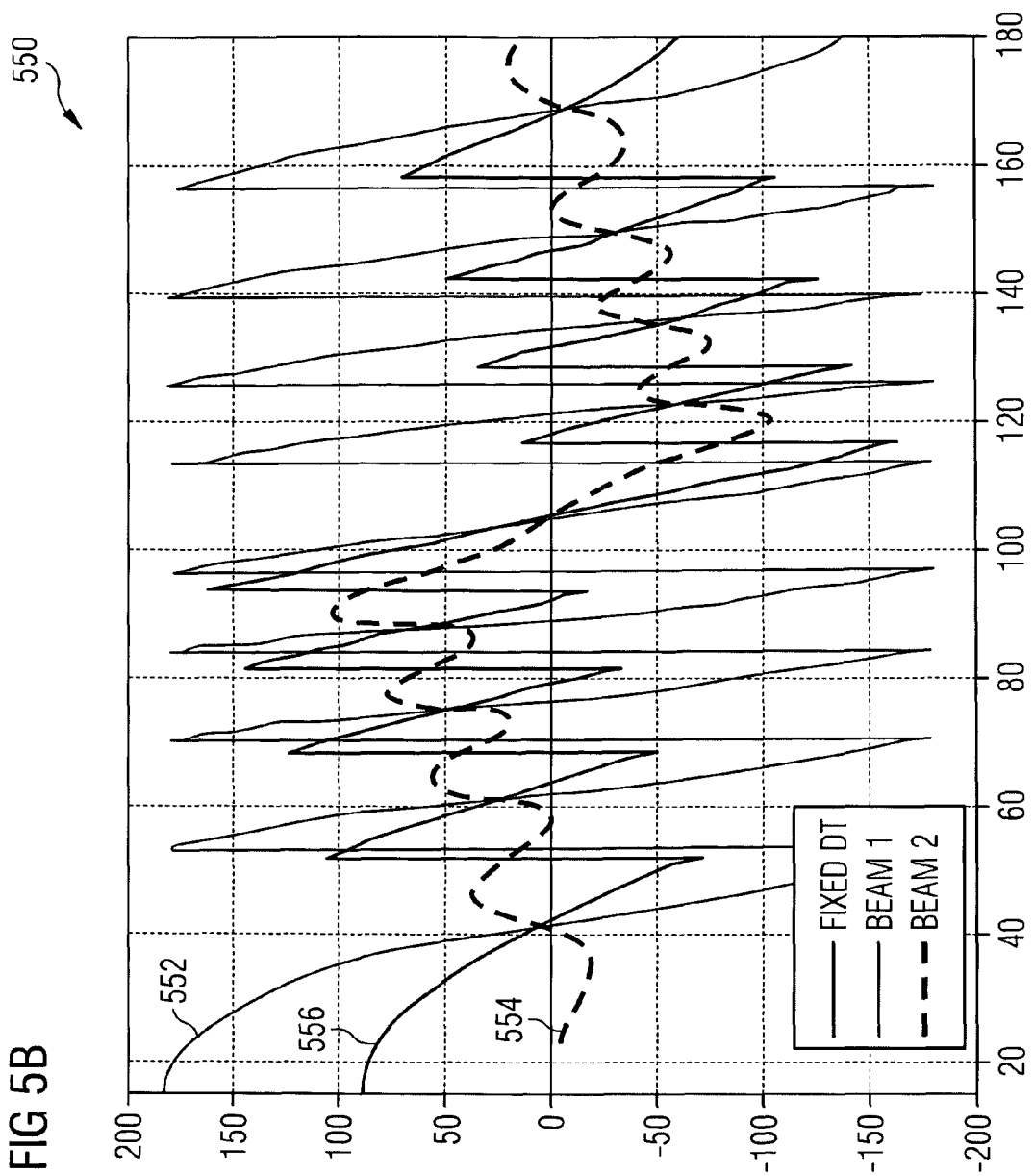

FIG 9A
FIG 9B
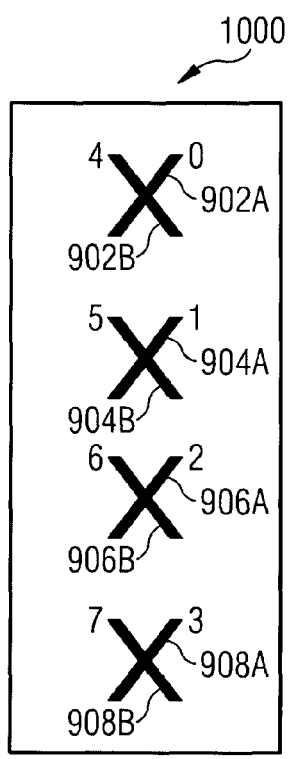
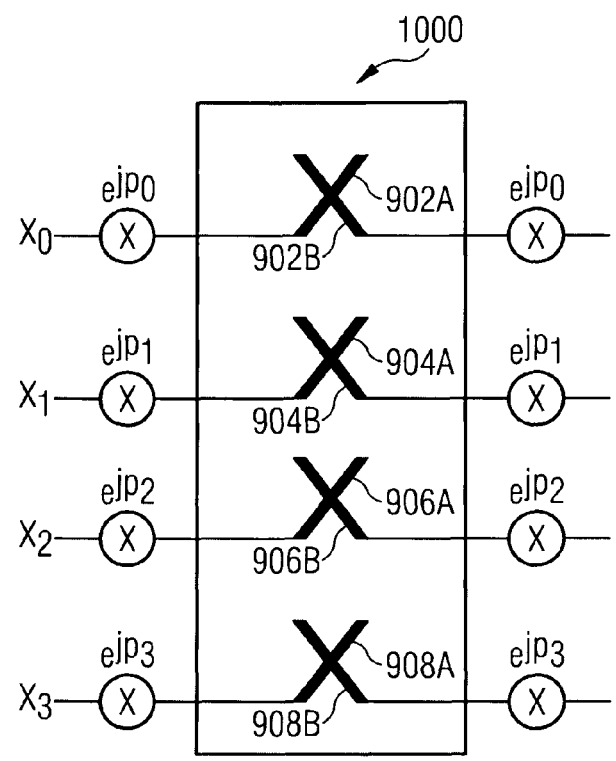

METHODS AND APPARATUS FOR BEAMFORMING

TECHNICAL FIELD

The present invention relates generally to telecommunications. More particularly, the invention relates to systems and techniques for beamforming using multiple antenna ports.

BACKGROUND

Modern cellular communication networks typically support numerous user devices, all of which are competing for limited communication resources. Communication service providers face the constant challenge of serving their many customers, many of whose activities consume significant resources, with the infrastructure and communication spectrum available to them. Adding infrastructure to meet increasing demand is costly. In addition, if the spectrum required by the demands of users is greater than the spectrum available to meet those demands, increasing infrastructure will not meet those demands.

To avoid the costs of adding infrastructure, and to help insure that the available spectrum will meet the demands placed upon it, service providers seek to use their available resources as efficiently as possible. One important aspect of efficient resource use is adapting signals to the devices to which they are being transmitted. One mechanism that can be used to adapt signals to devices being transmitted involves the design and use of antenna array structures comprising multiple array elements. A base station, such as an eNodeB (eNB) operating as part of a third generation preferred partnership (3GPP) long-term evolution (LTE) cellular network may comprise an antenna array structure and may coordinate signals using the array structure in order to efficiently direct a transmission. LTE network standards define a number of codebooks to reduce the signaling required between an eNB and a user equipment (UE). A codebook is simply a collection of vectors or matrices which describe the phasing of the eNB's transmit antenna array. Each entry (row) in a vector or matrix describes the corresponding phasing of eNB's port number corresponding to the row. In 3GPP, which port number maps to a particular physical antenna is implementation specific at an eNB. However as will be described, certain antenna array configurations (such as an array of 8 antennas made up of four cross-polarized antennas aligned in azimuth) have an implicit port to physical antenna mapping described in the standard 3GPP. A number of codebooks are defined, including codebooks designed for eNBs with specified numbers of transmit antennas. For example, an eNB may use a particular codebook based on the number of transmit antennas it employs: a 2-antenna eNB may use a 2-antenna codebook, for example, or an 8-antenna eNB may use an 8-antenna codebook. A UE performs feedback of information such as a precoder matrix index, rank indicator, and channel quality indicator (CQI) to an eNB. The UE spatial feedback for a subband represents a precoder, and CQI is computed based on the assumption that the eNB uses a specific precoder indicated by the feedback, on each subband within the CQI reference resource.

The eNB defines transmission to a UE based on the feedback received from the UE, and aspects of the transmission are defined by a codebook shared by the eNB and the UE. The codebook comprises a number of indexed lookup tables, so that information may be transferred between an eNB and a UE by transmitting an index, rather than the value represented by the index.

One mechanism used in cellular networks such as LTE cellular systems is beamforming, in which signal components are directed to elements of an antenna array so as to direct a transmission beam to a particular UE. One use of codebooks) is to allow for the definition of beamforming vectors, which provide information indicating the antenna array elements to be used for transmission to a UE and the weighting of signal components directed to each transmission element. A UE may select from its codebook the best beamforming matrix and may convey the selection over a feedback channel to the eNB. An index of the selected beamforming vector or matrix is fed back to the eNB, which then looks up the corresponding codebook and selects the beamforming vector or matrix indicated by the index.

SUMMARY

In one embodiment of the invention, a method comprises creating a set of associations between codebook antenna ports and physical sub-elements of an antenna array. Each of the set of associations associates an antenna port specified by a codebook accessible to a base station with one of a set of physical sub-elements of an antenna array of the base station. The physical sub-elements are arranged in cross-polarized pairs, and the pairs are arranged at least in according to elevation. The method further comprises interpreting feedback information from a user device to select from the codebook an entry comprising a vector of weighting values. Each of the weighting values defines a relative weighting for a signal component to be input to an antenna port specified by an entry of the codebook. The method further comprises applying the vector of weighting values to a signal configured for transmission to a user device to form a signal vector comprising a vector of weighted signal components and mapping each component of the vector of weighted signal components to a physical sub-element of the antenna array according to the set of associations.

In another embodiment of the invention, a method comprises determining a phasing value for each of a vector of signal components to be provided as inputs to an antenna array comprising a plurality of elevation ports. The phasing values are determined to maximize the rank 1 or rank 2 performance of the codebook feedback given the particular RF beams used in the elevation dimension. The method further comprises applying the phasing values to signal components corresponding to antenna ports defined by a codebook accessible to a base station.

In another embodiment of the invention, an apparatus comprises at least one processor and memory storing computer program code. The memory storing the computer program code is configured to, with the at least one processor, cause the apparatus to at least create a set of associations between codebook antenna ports and physical sub-elements of an antenna array. Each of the set of associations associates an antenna port specified by a codebook accessible to a base station with one of a set of physical sub-elements of an antenna array of the base station. The physical sub-elements are arranged in cross-polarized pairs, and the pairs are arranged at least in according to elevation. The apparatus is further caused to interpret feedback information from a user device to select from the codebook an entry comprising a vector of weighting values. Each of the weighting values defines a relative weighting for a signal component to be input to an antenna port specified by an entry of the codebook. The apparatus is further caused to apply the vector of weighting values to a signal configured for transmission to a user device to form a signal vector comprising a vector of weighted signal components and map each component of the vector of weighted signal components to a physical sub-element of the antenna array according to the set of associations.

BRIEF DESCRIPTION OF THE DRAWINGS

FIGS. 2-4 illustrate antenna arrays according to embodiments of the present invention;

FIGS. 5A and 5B illustrate properties of elevation beams transmitted using an embodiment of the present invention;

FIGS. 9-11, each of which has A and B figures, illustrate antenna array configurations according to an embodiment of the present invention;

DETAILED DESCRIPTION

Embodiments of the present invention recognize that the codebooks defined by 3GPP have been designed with a particular array type in mind. For example, the 8 antenna codebook was designed for an array made up of four co-located cross-polarized antennas aligned in the azimuth direction where each of the co-located antennas consists of two antennas with orthogonal polarizations (typically a +45 and a −45 polarization). Embodiments of the present invention further recognize that using the defined codebooks in arrays (such as an array of antennas aligned in the vertical dimension) without proper mapping of antenna elements to the codebook ports will result in a significant loss of performance. One or more embodiments of the present invention therefore provide mechanisms for optimally mapping the defined LTE codebook ports to the appropriate physical antenna elements for arrays with antennas aligned in the vertical and horizontal dimensions.

Embodiments of the present invention recognize that inputs to antenna array sub-elements (antenna elements within a single array panel that are aligned in the vertical direction) can be controlled so as produce effective elevation ports, allowing for beamforming that takes into account elevation as well as azimuth. Such beamforming may be used to define multiple elevation sectors, or to more precisely direct beams to specific UEs.

Figure 1:
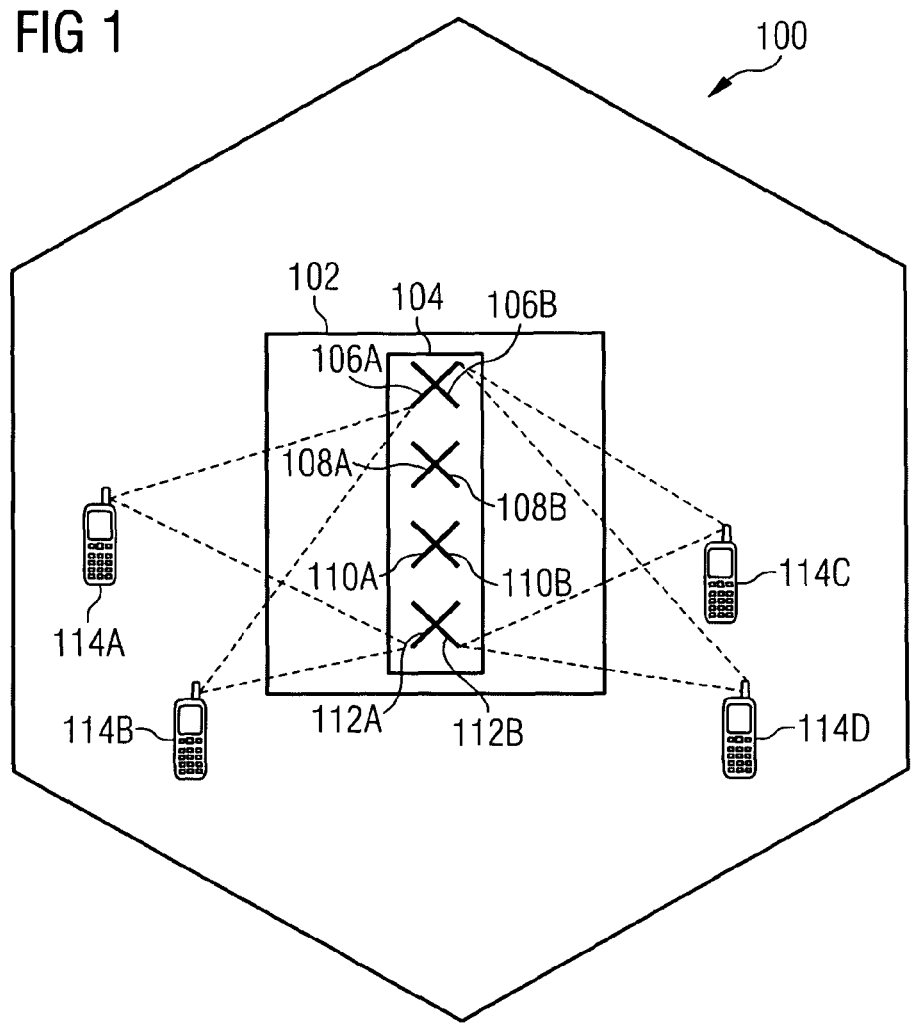
FIG. 1 illustrates an embodiment of the present invention.

FIG. 1 illustrates a network according to an element of the present invention. The network comprises a cell 100, defined as an area served by an eNB 102. The eNB 102 comprises an array panel 104, comprising sub-elements 106A and 106B, 108A and 108B, 110A and 110B, and 112A and 112B, arranged in pairs, with the pairs suitably exhibiting opposite polarizations such as +45 (for exazmple, for the "A" elements) and −45 degrees (for example, for the "B" elements).

The eNB 102 is illustrated as supporting a plurality of UEs 114A-114D. The eNB 102 is illustrated here as transmitting signals to the UEs 114A-114D, using beams directed at each of the eNBs 114A-114D. The beams are formed through control of signal components directed to the sub-elements of the array 104.

Embodiments of the present invention recognize that selection of sub-elements and combinations of sub-elements to be used for transmission can be controlled so as to create multiple logical elevation ports, as well as azimuth ports. Such ports can be used, for example, to adapt transmission in the elevation dimension as well as in the azimuth dimension. For example, each azimuth spatial stream may be steered with a single UE-specific tilt in elevation. In this case, rank, that is, spatial rank or equivalently the number of data streams supported (that is, chosen by the UE) may be effectively limited by the number of azimuth antennas at the eNB for the case of single-user spatial multiplexing. For example, in an array comprising four pairs of vertically arranged sub-elements, two elements are arranged by azimuth, so that the rank values are 1 and 2.

Figure 2:
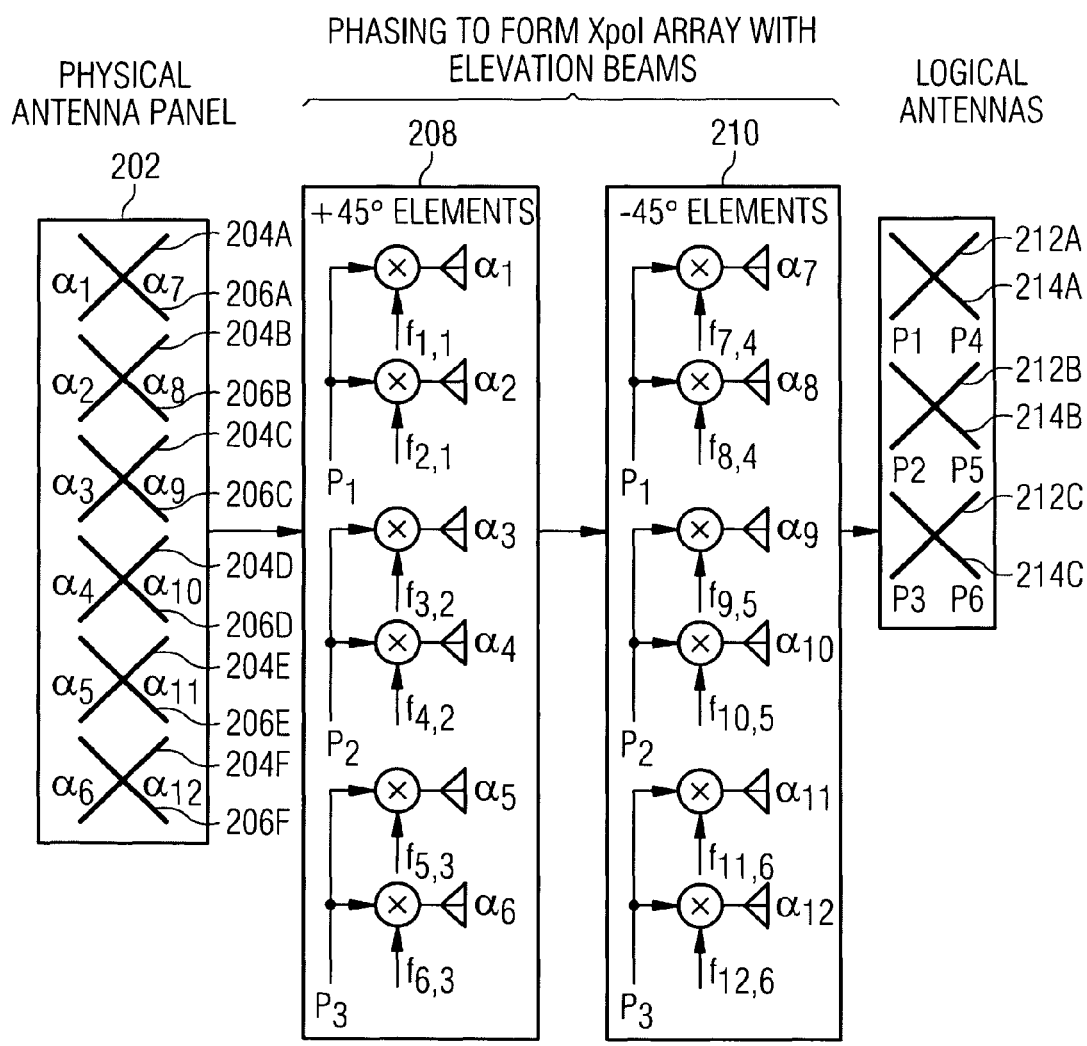
Figure 3:
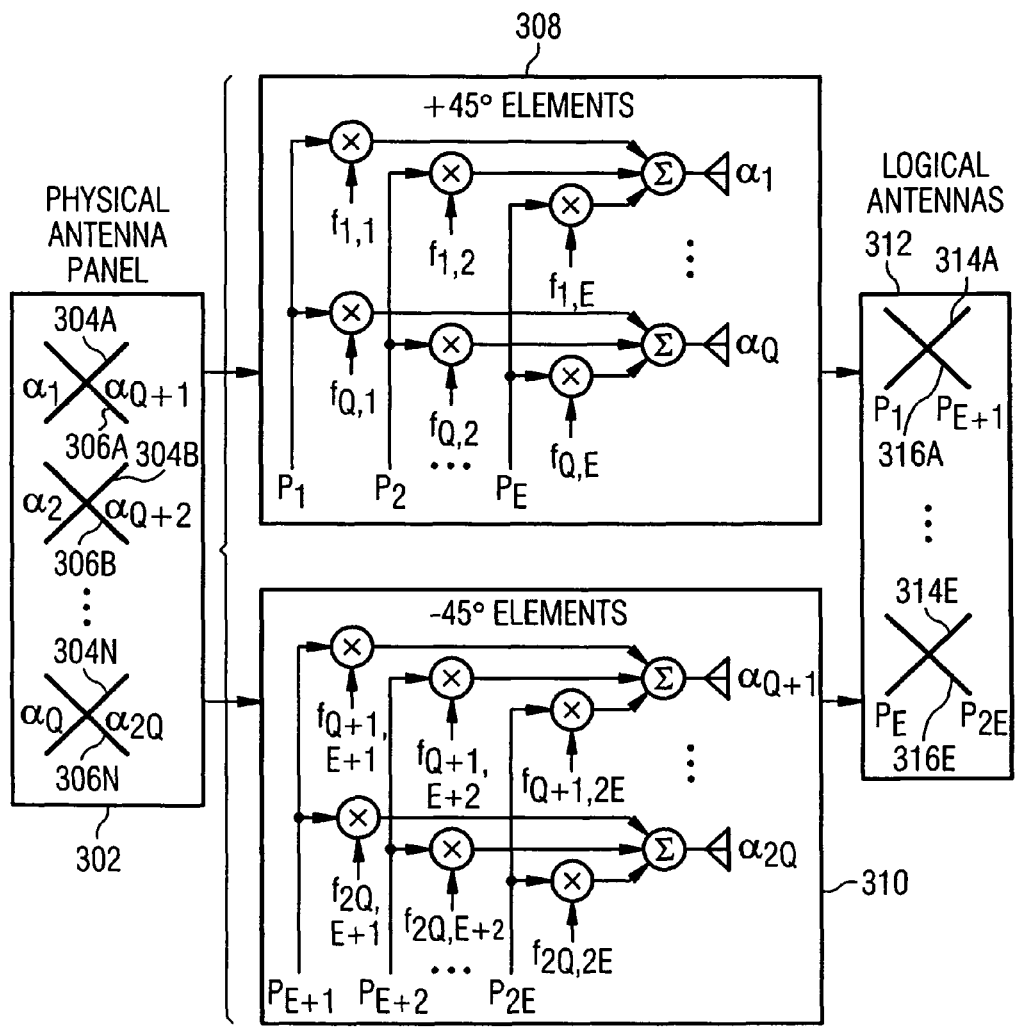

Embodiments of the present invention further recognize that phasing of inputs to antenna array sub-elements can be performed so as to provide more precise control of elevation and provide improved gains as compared to simply selecting elements to be used for signal components. FIGS. 2 and 3 illustrate antenna arrays subjected to phasing operations, and FIGS. 4-6 illustrate graphs showing signal characteristics produced by phasing of signals.

FIG. 2 illustrates an array 200 according to an embodiment of the present invention, comprising a physical antenna panel 202 comprising pairs of sub-elements 204A and 206A through 204F and 206F. The elements 204A-204F are designated as $\alpha_1$-$\alpha_6$, respectively, and the elements 206A-206F are designated as $\alpha_7$-$\alpha_{12}$, respectively. The elements are subjected to phasing operations 208 and 210, designed to phase all antennas of the corresponding polarization. The signals $P_1$, $P_2$, and $P_3$, are phased by the values $f_{1,1}$ and $f_{2,1}$, $f_{3,2}$ and $f_{4,2}$, and $f_{5,3}$ and $f_{6,3}$. The signals $P_4$, $P_5$, and $P_6$, are phased by the values $f_{7,4}$ and $f_{8,4}$, $f_{9,5}$ and $f_{10,5}$, and $f_{11,6}$ and $f_{12,6}$. The phasing operations 208 and 210, as they are performed on the sub-elements of the array 202, form logical antenna ports comprising logical elements 212A and 214A, 212B and 214B, and 212C and 214C. The logical ports may act as multiple elevation ports, with characteristics of the elevation ports, such as the degree of downtilt exhibited by the elevation ports, depending on the phasing operations 208 and 210.

FIG. 3 illustrates an array 300 according to an embodiment of the present invention, comprising a physical antenna panel 302. The physical antenna panel 302 comprises pairs of elements 304A and 306A, 304B and 306B, on through 304N and 306N. The elements 304A, 304B, . . . , 304N may be designated as $\alpha_1, \alpha_2, \ldots, \alpha_Q$, respectively, and the elements 306A, 306B, . . . , 306N may be designated as $\alpha_{Q+1}, \alpha_{Q+2}$, respectively. The elements are subjected to phasing operations 308 and 310, designed to phase all antennas of the corresponding polarization. The signals $P_{E+1}, P_{E+2}, \ldots, P_{2E}$, supplied to the +45-degree elements, are phased by the values $f_{1,1}$ and $f_{Q,1}$, $f_{1,2}$ and $f_{Q,2}, \ldots, f_{1,E}$ and $f_{Q,E}$. The signals $P_{E+1}, P_{E+2}, \ldots, P_{2,E}$, supplied to the −45-degree elements, are phased by the values $f_{Q+1,E+1}$ and $f_{2Q,E+1}$, $f_{Q+1,E+2}$ and $f_{2Q,E+2}, \ldots, f_{Q+1,2E}$ and $f_{2Q,2E}$. The outputs of the phasing operations are summed to create logical ports 312, comprising logical pairs of elements 314A and 316A through 314E and 316E. Phasing between all antennas allows significant control over effective elevation and downtilt.

FIG. 4 illustrates a graph 400 of the relation between normalized power and elevation angle, as presented by curves 402 and 404. In these curves an elevation angle of 0 is in the x-y plane and negative values are for elevation angles below the x-y plane. The curves 402 and 404 present the performance of exemplary first and second elevation beams (E=2 in FIG. 3), each formed from 10 vertical sub-elements (N=Q=10 in FIG. 3), with 15 degree nominal downtilt assumed (steered electrically at RF). The beams would be applied to two polarizations as shown in FIG. 3 to form E=2 elevation ports per polarization. The elevation beams form antenna ports in the elevation dimension that can be used to control the elevation dimension through the use of the aforementioned codebook feedback procedures.

Figure 5A:
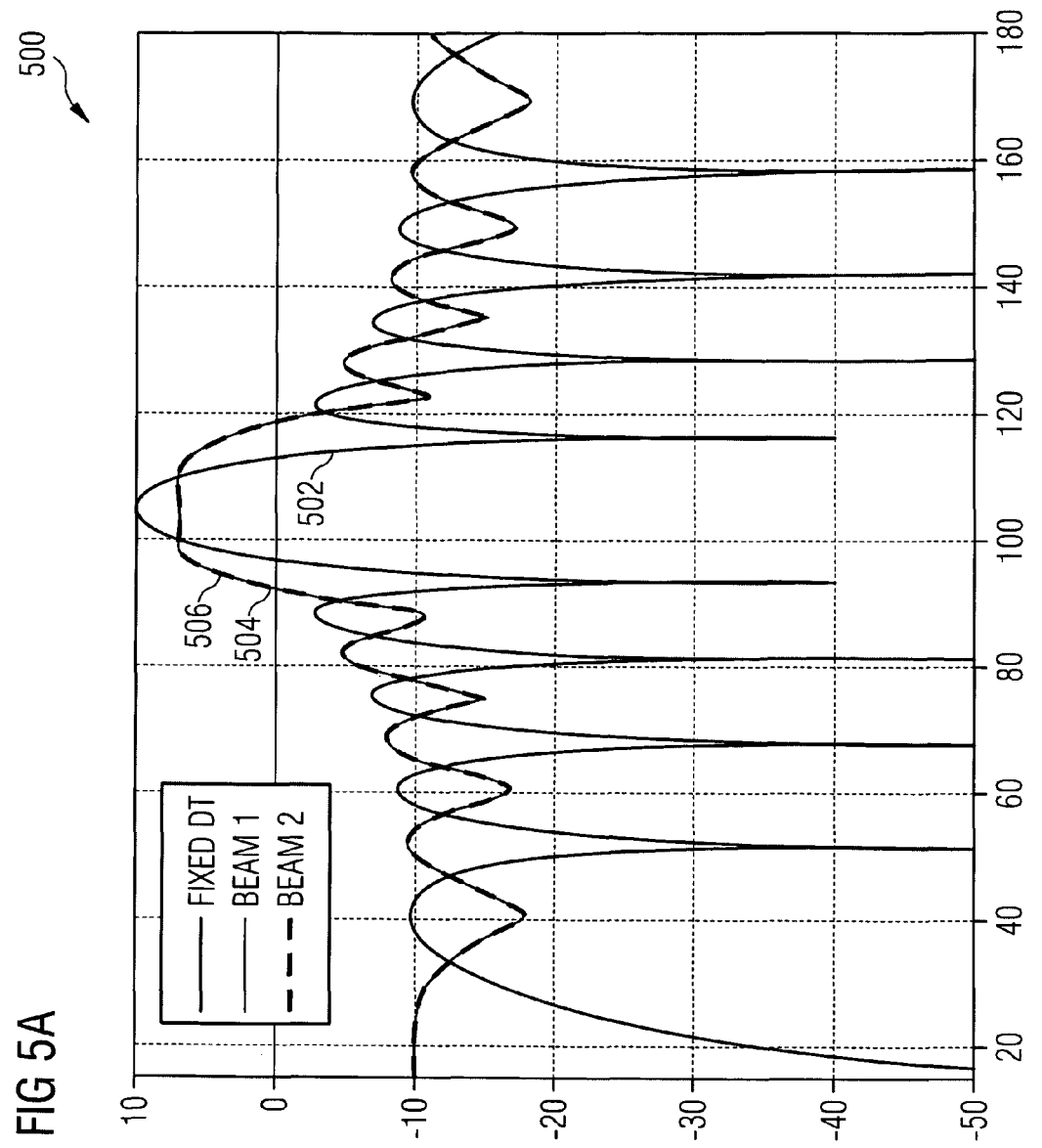
Figure 6:
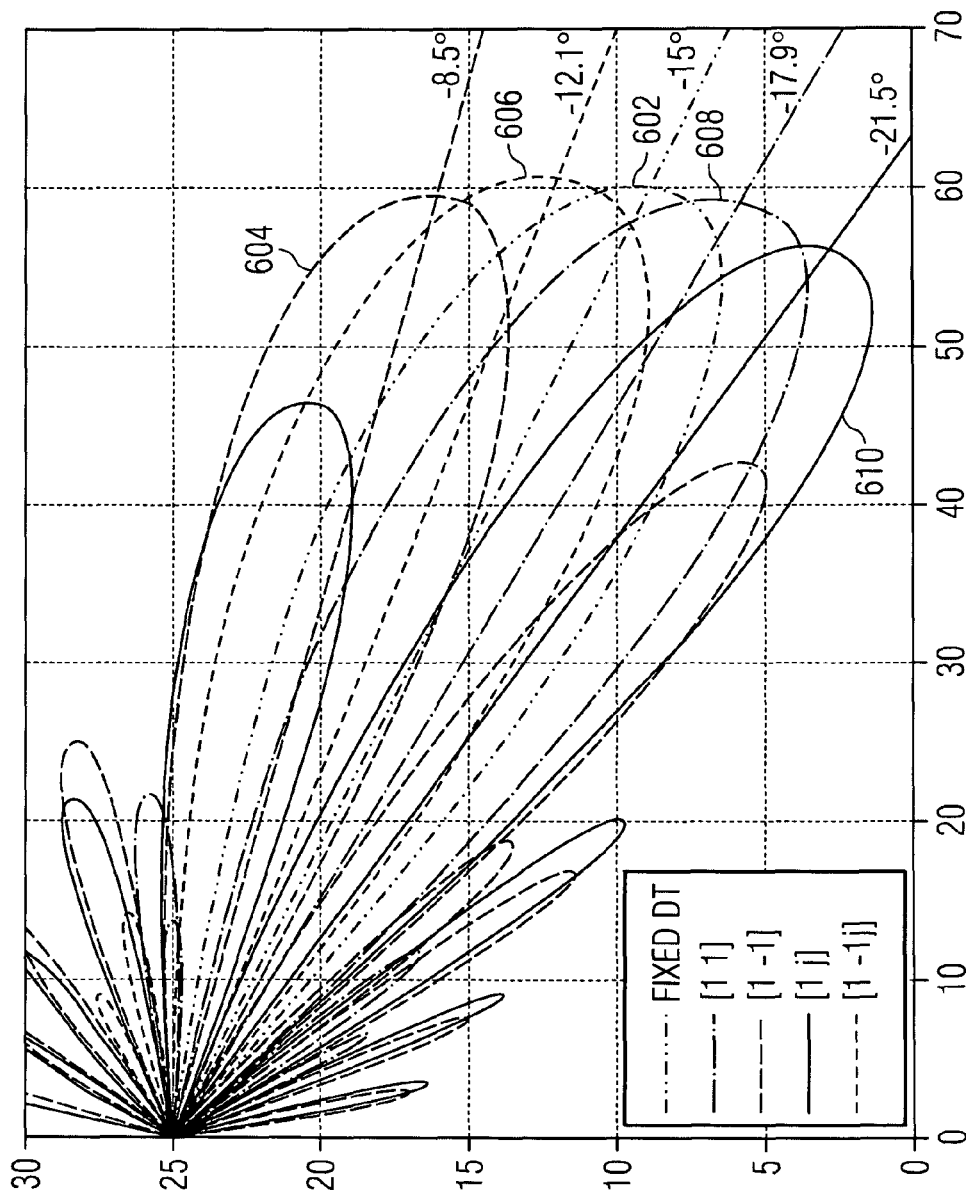
FIG. 6 illustrates a transmission controlled using an embodiment of the present invention.

FIGS. 5A and 5B illustrate gain and phase, respectively, of another exemplary pair of two elevation beams, which may be viewed as being transmitted from two effective elevation ports (in these curves 90 degrees is in the x-y plane and angles greater than 90 degrees are below the x-y plane). The E=2 beams are created by weighting N=Q=10 vertically arranged half-wavelength spaced physical sub-elements within a panel array (again these beams would be applied to both polarizations in the array). FIG. 5A illustrates a graph 500 presenting curves 504 and 506, representing gain versus elevation angle for first and second elevation beams. The curves 504 and 506 illustrate gain relative to that for a fixed downtilt (DT), and the gain for a fixed downtilt is presented by a curve 502 representing gain versus elevation angle for the fixed downtilt. FIG. 5B illustrates a graph 550 of phase versus elevation angle for first and second elevation beams, with the curves 552 and 554 presenting the phase versus elevation angle for the first and second beams, respectively, relative to a fixed downtilt, represented by the curve 556 showing phase versus elevation angle for the fixed downtilt.

FIG. 6 illustrates a graph 600 showing the result of control of elevation beamspace weights using two elevation ports, co-phased with a 2×1 elevation beamforming weight vector, taken from the long term evolution (LTE) 2-antenna codebook. The graph 600 presents a pattern plotting beam power in dB against distance from a transmitting eNB, for a fixed 15-degree downtilt represented by the curve 602 (in these plots 0 degrees is assumed to be in the x-y plane and negative angles are for elevations below the x-y plane). The curve 604 represents the result of an 8.5-degree downtilt, achieved with [1 -1] co-phasing, the curve 606 represents the result of a 12.1-degree downtilt, achieved with [1 -j] co-phasing, the curve 608 represents the result of a 17.9-degree downtilt, achieved with [1 1] co-phasing, and the curve 610 represents the result of a 21.5-degree downtilt, achieved with [1 j] co-phasing.

Embodiments of the present invention recognize that elevation beamforming provides a way to steer beams in three dimensions, using both azimuth and elevation, through appropriate control of panel arrays such as those described above. Utilizing the additional dimension provides for improved beamforming gains.

Embodiments of the present invention further recognize that fixed weight vectors need not be used to control elevation and that the use of fixed weight vectors can reduce gains that could otherwise be achieved. Embodiments of the invention therefore provide for control of elevation using weight vectors and phase values chosen to optimize performance.

Figure 7:
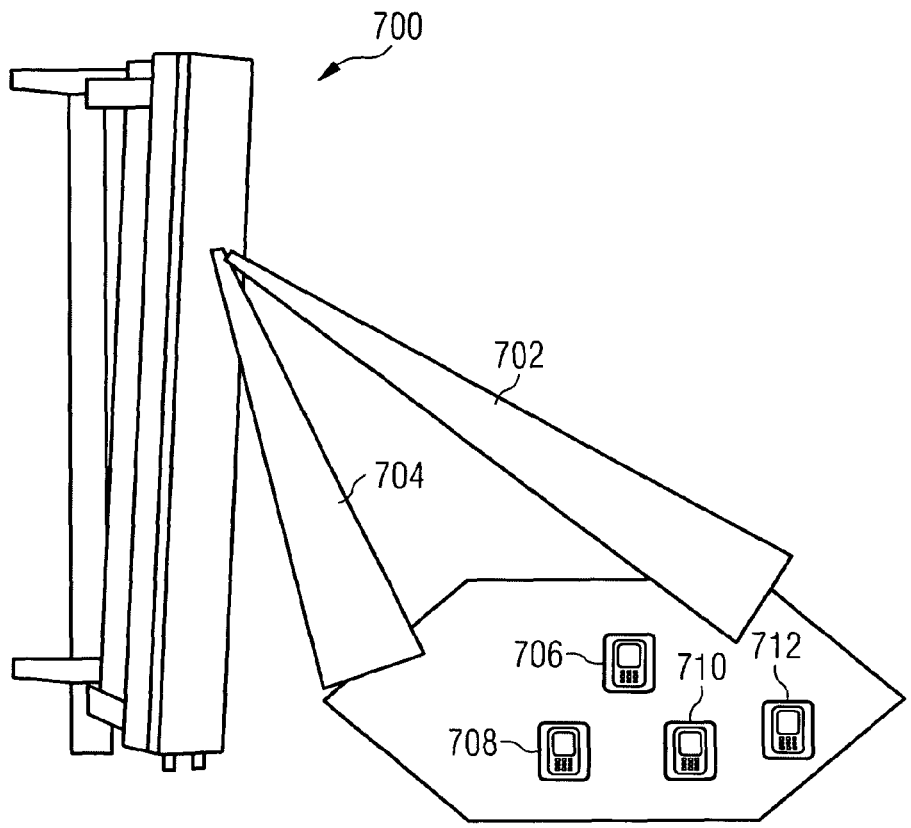
FIG. 7 illustrates an exemplary use of beamforming that may be implemented using an embodiment of the present invention.

FIG. 7 illustrates an antenna array 700, using elevation ports that allow directing of multiple beams directed to specific UEs. The ports are defined through the addition of vertical beam steering to closed loop single user multi-input/multi-output techniques (such as the codebook feedback operation previously mentioned). Each azimuth spatial stream is steered with a UE-specific tilt in elevation. For example, the beam 702 illustrated here is directed to the UE 712, and the beam 704 is illustrated here as being directed to the UE 708.

It will be recognized by those skilled in the art that sub-elements defined by a codebook comprise logical ports, and that elements of an eNB may comprise information mapping logical ports defined by a codebook to the specific physical elements mapped to the antenna array used by the eNB. To be more specific, a codebook is made up of a collection of vectors (for rank 1 transmission) or matrices (for transmission rank >1) where the row of the vector or matrix corresponds to the phasing for one logical port. In the case of a matrix, the columns correspond to the phasing on different data streams. Embodiments of the present invention therefore provide for mapping of codebook port definitions to physical elements in such a way that an eNB is able to use the codebook to control azimuth and elevation beamforming. Suitably, beamforming is UE-specific, and control of azimuth includes polarization.

Figure 8:
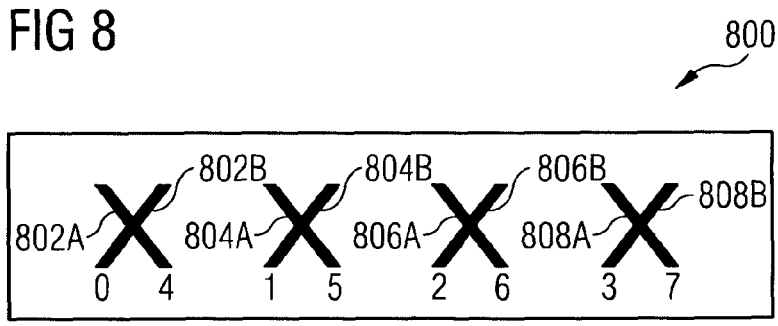
FIG. 8 illustrates the mapping of the 3GPP 8 antenna codebook ports to the physical antennas in an array with elements aligned in the azimuth direction.

FIG. 8 illustrates an antenna array 800 comprising sub-elements arranged in order of azimuth, with the elements being arranged in cross-polarized pairs. The sub-elements comprise elements 802A, 804A, 806A, and 808A, exhibiting a −45-degree polarization, and elements 802B, 804B, 806B, and 808B, exhibiting a +45-degree polarization. The LTE codebook for 8 transmit antennas defines ports 0-7, and the antenna array 800 may be mapped such that ports are mapped to sub-elements as follows:

| LTE Codebook Port | Sub-element |
| --- | --- |
| 0 | 802B |
| 1 | 804B |
| 2 | 806B |
| 3 | 808B |
| 4 | 802A |
| 5 | 804A |
| 6 | 806A |
| 7 | 808A |

As noted above, embodiments of the present invention recognize that antenna array sub-elements may be vertically arranged, and that such an arrangement allows for control of elevation beamforming as well as azimuth beamforming. Embodiments of the present invention further recognize that codebook information may be used to control such elevation and azimuth beamforming, but that proper mapping of the logical ports defined by the codebook, taking into account the specific arrangement of the physical elements, provides for improved gain and throughput. Embodiments of the present invention further recognize that properly selected phasing of signals input to the physical elements provide for further improved gain and throughput.

Appropriate phases may be determined by maximizing rank 1 gain, or rank 2 or higher performance. The term "rank" refers to the number of independent spatial layers in the channel, with rank 1 referring to a channel with one spatial layer, rank 2 referring to a channel with 2 spatial layers, and so on. Different combinations of phase values may be used for configuring different beams (for example, the beams created in FIG. 3), with the phase values being determined so as to optimize the performance of the particular beam with the codebook. Thus, the complex weighting for a particular transmission may be based at least in part on codebook feedback from a UE and may also be based on the phase values for the beam choices, so that appropriate phasing in conjunction with the codebook selection may achieve a desired downtilt for the UE.

FIGS. 9A and 9B illustrate a physical array 900 according to an embodiment of the present invention for an 8 transmit antenna array with pairs of elements arrayed in the vertical direction. The array comprises physical sub-elements 902A and 902B, 904A and 904B, 906A and 906B, and 908A and 908B, with the sub-elements 902A, 904A, 906A and 908A exhibiting a +45-degree polarization and with the sub-elements 902B, 904B, 906B and 908B exhibiting a −45-degree polarization. The sub-elements are paired, with 902A and 902B forming a pair, 904A and 904B forming a pair, and so on, and the pairs forming elevation ports, and with the ports being vertically arranged according to descending elevation. The +45-degree sub-elements, that is, 902A, 904A, 906A, and 908A, are mapped to the codebook ports 0, 1, 2, and 3, respectively. The −45-degree sub-elements, that is, 902B, 904B, 906B, and 908B, are mapped to the codebook ports 4, 5, 6, and 7, respectively. That is, the signals defined as being supplied to the codebook ports 0-7 are supplied to the corresponding physical sub-elements.

In addition to mapping codebook ports to physical sub-elements, embodiments of the present invention also define phasing inputs to be applied to signals corresponding to the codebook signals and supplied to the sub-elements. FIG. 9B illustrates the array of sub-elements 902A, 902B, 904A, 904B, 906A, 906B, 908A, and 908B, along with the signals $X_0$, $X_1$, $X_2$, $X_3$, $X_4$, $X_5$, $X_6$, $X_7$. Phasing inputs of $\exp(jp_0)$, $\exp(jp_1)$, $\exp(jp_2)$, and $\exp(jp_3)$ are respectively applied to $X_0$, $X_1$, $X_2$, $X_3$ and to $X_4$, $X_5$, $X_6$, $X_7$ where at least one of $p_0$ through $p_3$ are non-zero. An example of the phasing inputs could be $\exp(j0)$, $\exp(j2.23)$, $\exp(j\pi/2)$, and $\exp(j\pi)$. Note that the signals $X_0$ through $X_7$ are the actual signals (at either baseband or RF) to be transmitted out of each physical antenna. For example with a rank 1 transmission and the codebook vector being given by $[w_0, \ldots, w_7]^T$, the transmitted signal for $X_n = w_n s$ where s is a data symbol.

Figure 10A:
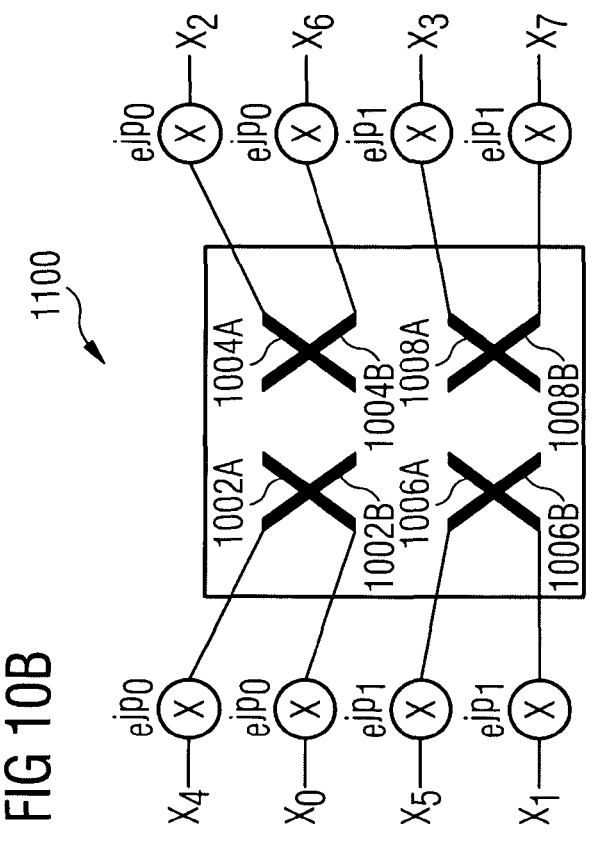

As an alternative to arranging four pairs of elements according to elevation and each member of the pair according to azimuth, the pairs of elements may be arranged in rows of two pairs each. FIG. 10A illustrates an array 1000, comprising physical sub-elements 1002A and 1002B, 1004A and 1004B, 1006A and 1006B, and 1008A and 1008B, with the sub-elements 1002A, 1004A, 1006A and 1008A exhibiting a +45-degree polarization and with the sub-elements 1002B, 1004B, 1006B and 1008B exhibiting a +45-degree polarization. The sub-elements are paired, with 1002A and 1002B forming a pair, 1004A and 1004B forming a pair, and so on, and the pairs forming elevation ports arranged in rows and azimuth ports arranged in columns.

The +45-degree sub-elements, that is, 1002A, 1006A, 1004A, and 1008A, are mapped to the codebook ports 0, 1, 2, and 3, respectively. The −45-degree sub-elements, that is, 1002B, 1006B, 1004B, and 1008B, are mapped to the codebook ports 4, 5, 6, and 7, respectively. That is, the signals defined as being input to the codebook ports 0-7 are input to the corresponding physical sub-elements.

Figure 10B:
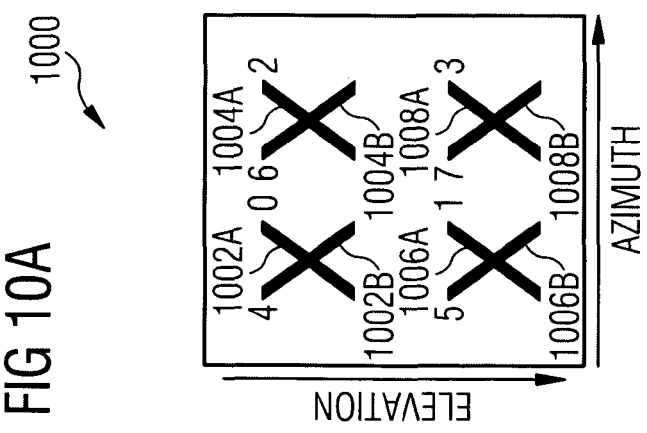

In addition to mapping codebook ports to physical sub-elements, embodiments of the present invention also define phasing inputs to be applied to signals corresponding to the codebook signals and supplied to the sub-elements. FIG. 10B illustrates the array of sub-elements 1002A, 1002B, 1004A, 1004B, 1006A, 1006B, 1008A, and 1008B, along with the signals $X_0$, $X_1$, $X_2$, $X_3$, $X_4$, $X_5$, $X_6$, $X_7$. Phasing inputs of $\exp(jp_0)$, $\exp(jp_0)$, $\exp(jp_1)$, and $\exp(jp_1)$ are respectively applied to $X_0$, $X_1$, $X_2$, $X_3$ and to $X_4$, $X_5$, $X_6$, $X_7$ where at least one of $p_0$ or $p_1$ is non-zero. An example of the phasing inputs could be $\exp(j0)$, $\exp(j0)$, $\exp(-j0.325)$, and $\exp(-j0.325)$. Note that the signals $X_0$ through $X_7$ are the actual signals to be transmitted out of each physical antenna. For example with a rank 1 transmission and the codebook vector being given by $[w_0, \ldots, w_7]^T$, the transmitted signal for $X_n = w_n s$ where s is a data symbol.

Figure 11B:
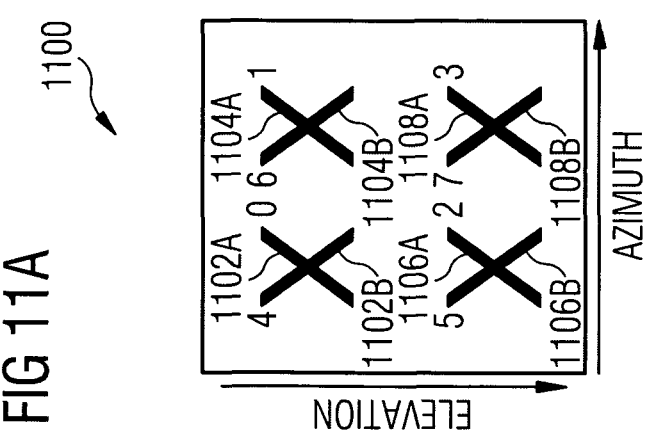
Figure 11A:
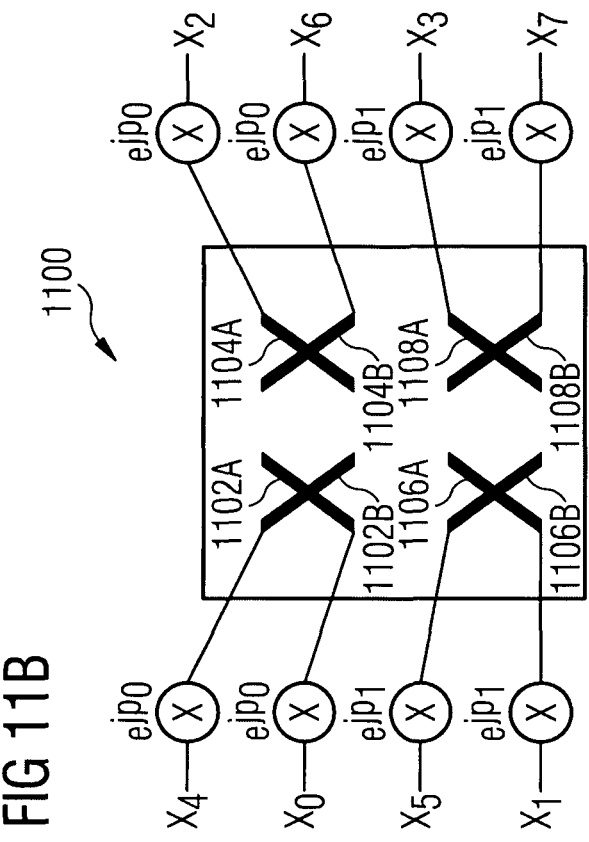

FIG. 11A illustrates an array 1100, comprising physical sub-elements 1102A and 1102B, 1104A and 1104B, 1106A and 1106B, and 1108A and 1108B, with the sub-elements 1102A, 1104A, 1106A and 1108A exhibiting a +45-degree polarization and with the sub-elements 1102B, 1104B, 1106B and 1108B exhibiting a −45-degree polarization. The sub-elements are paired, with 1102A and 1102B forming a pair, 1104A and 1104B forming a pair, and so on, and the pairs forming elevation ports arranged in rows and azimuth ports arranged in columns.

In the array 1100, +45-degree sub-elements, that is, 1102A, 1104A, 1106A, and 1108A, are mapped to the codebook ports 0, 1, 2, and 3, respectively. It will be noted that the specific arrangement differs from that of the array 1000. In the array 1100, the codebook port 0 is mapped to the sub-element 1102A, the codebook port 1 is mapped to the sub-element 1104A, the port 2 is mapped to the sub-element 1106A, and the port 3 is mapped to the sub-element 1108A. As for the −45 degree sub-elements, the port 4 is mapped to the sub-element 1102B, the port 5 is mapped to the sub-element 1104B, the port 6 is mapped to the sub-element 1106B, and the port 7 is mapped to the sub-element 1108B.

In addition to mapping codebook ports to physical sub-elements, embodiments of the present invention also define phasing inputs that can be applied to signals corresponding to the codebook signals and supplied to the sub-elements. FIG. 11B illustrates the array of sub-elements 1102A, 1102B, 1104A, 1104B, 1106A, 1106B, 1108A, and 1108B, along with the signals $X_0$, $X_1$, $X_2$, $X_3$, $X_4$, $X_5$, $X_6$, $X_7$. Phasing inputs of $\exp(jp_0)$, $\exp(jp_0)$, $\exp(jp_1)$, and $\exp(jp_1)$ are respectively applied to $X_0$, $X_1$, $X_2$, $X_3$ and to $X_4$, $X_5$, $X_6$, $X_7$ where at least one of $p_0$ or $p_1$ is non-zero. An example of the phasing inputs could be $\exp(j0)$, $\exp(j0)$, $\exp(j2.62)$, and $\exp(j2.62)$. Note that the signals $X_0$ through $X_7$ are the actual signals to be transmitted out of each physical antenna. For example with a rank 1 transmission and the codebook vector being given by $[w_0, \ldots, w_7]^T$, the transmitted signal for $X_n = w_0 s$ where s is a data symbol.

Embodiments of the present invention further recognize that a number of resources are available that can be used to manage elevation beamforming. For example, the 8-transmit antenna LTE codebook can be used to provide channel state information feedback from UEs, and this information can be used to particular advantage in the case of 8 total ports in azimuth and elevation. For example, an array may provide 4 azimuth ports and 2 elevation ports/beams and or 2 azimuth ports and 4 elevation ports/beams. However, embodiments of the invention recognize that the ports of the codebook cannot be arbitrarily mapped to the physical azimuth and elevation ports without performance loss. Embodiments of the present invention therefore define an optimal mapping of codebook ports to physical azimuth and elevation ports. In addition, embodiments of the present invention define an elevation beam-specific phase that can be applied to the signals going into the elevation and azimuth ports.

Figure 12:
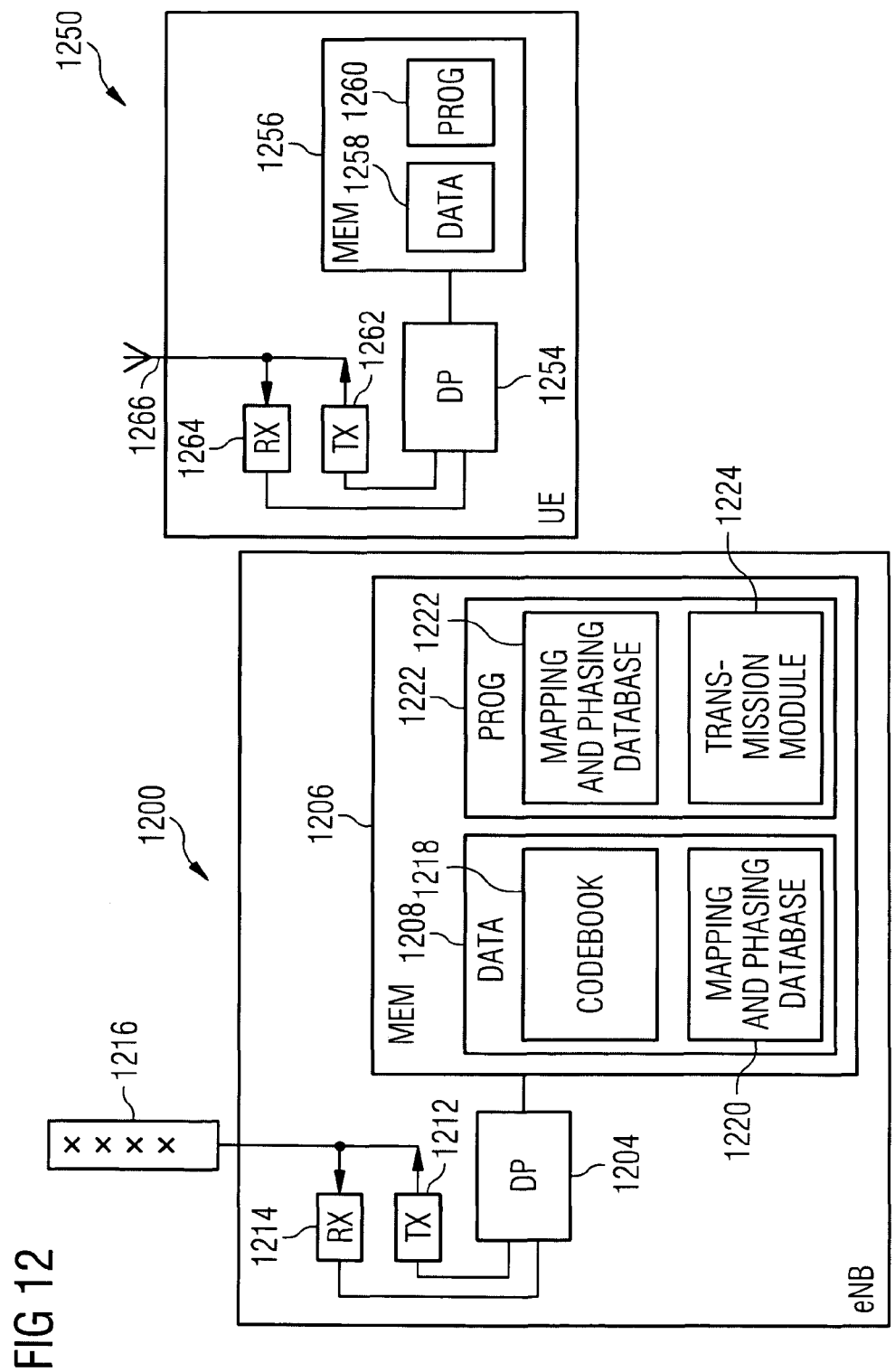
FIG. 12 illustrates devices that may be used in a network configured according to an embodiment of the present invention.

Reference is now made to FIG. 12 for illustrating a simplified block diagram of a base station, such an eNB 1200 and a user device, such as a UE 1250, suitable for use in practicing the exemplary embodiments of this invention. In FIG. 12 an apparatus, such as the eNB 1200, is adapted for communication with other apparatuses having wireless communication capability, such as the UE 1250.

The eNB 1200 includes processing means such as at least one data processor (DP) 1204, storing means such as at least one computer-readable memory (MEM) 1206 storing data 1208 and at least one computer program (PROG) 1210 or other set of executable instructions, communicating means such as a transmitter TX 1212 and a receiver RX 1214 for bidirectional wireless communications with the UE 1250 via an antenna array 1216. The antennas 1216 may suitably be an array of 8 sub-elements, arranged in cross-polarized pairs, with pairs being arranged according to one or more of azimuth and elevation.

The data 1208 may suitably include a codebook, such as an 8 transmit antenna LTE codebook 1218, defining operations for 8 antenna ports. The codebook defines a plurality of vectors that may be selected based on feedback from a UE such as the UE 1250. The data 1208 may also include a mapping and phasing database 1220, associating a physical sub-element of the eNB 1200 with each of the antenna ports defined in the codebook 1218. Association of a physical sub-element with a codebook port may be defined based at least in part on elevation and azimuth of the sub-element, with the associations being based at least in part on optimization of overall signal vector gain in UE-specific beamforming. The mapping and phasing database 1220 may also include phasing information so that each signal component provided to a physical antenna sub-element may be subjected to a desired phasing weight. The phases are matched to the actual elevation beams that are to be used and may be determined, for example, by maximizing rank 1 gain or rank 2 or higher performance. The eNB 1200 may also include among the PROGs 1210 a communication module 1222 that prepares a signal for transmission to a UE such as the UE 1250. The communication module 1222 examines feedback received from a UE and data to be transmitted to the UE. The communication module 1222 selects a codebook vector comprising weighting information for signal components to be input to each codebook port. The communication module 1222 uses information from the mapping and phasing database 1220 to define the physical sub-elements to which signal components are to be directed, the weightings to be applied to each of the signal components, and the optional phasing values to be applied to the signal components. The communication module 1222 passes the signal to a transmission module 1224, which configures a signal for transmission from the antenna array 1216.

The UE 1250 includes processing means such as at least one data processor (DP) 1254, storing means such as at least one computer-readable memory (MEM) 1256 storing data 1258 and at least one computer program (PROG) 1260 or other set of executable instructions, communicating means such as a transmitter TX 1262 and a receiver RX 1264 for bidirectional wireless communications with the eNB 1200 via one or more antennas 1266.

At least one of the PROGs 1210 in the eNB 1200 is assumed to include a set of program instructions that, when executed by the associated DP 1204, enable the device to operate in accordance with the exemplary embodiments of this invention, as detailed above. In these regards the exemplary embodiments of this invention may be implemented at least in part by computer software stored on the MEM 1206, which is executable by the DP 1204 of the eNB 1200, or by hardware, or by a combination of tangibly stored software and hardware (and tangibly stored firmware). Similarly, at least one of the PROGs 1260 in the UE 1250 is assumed to include a set of program instructions that, when executed by the associated DP 1254, enable the device to operate in accordance with the exemplary embodiments of this invention, as detailed above. In these regards the exemplary embodiments of this invention may be implemented at least in part by computer software stored on the MEM 1256, which is executable by the DP 1254 of the UE 1250, or by hardware, or by a combination of tangibly stored software and hardware (and tangibly stored firmware). Electronic devices implementing these aspects of the invention need not be the entire devices as depicted at FIG. 1 or FIG. 12 or may be one or more components of same such as the above described tangibly stored software, hardware, firmware and DP, or a system on a chip SOC or an application specific integrated circuit ASIC.

In general, the various embodiments of the UE 1250 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 1206 and 1256 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 1204 and 1256 include but are not limited to general purpose computers, special purpose computers, microprocessors, digital signal processors (DSPs) and multi-core processors.

Figure 13:
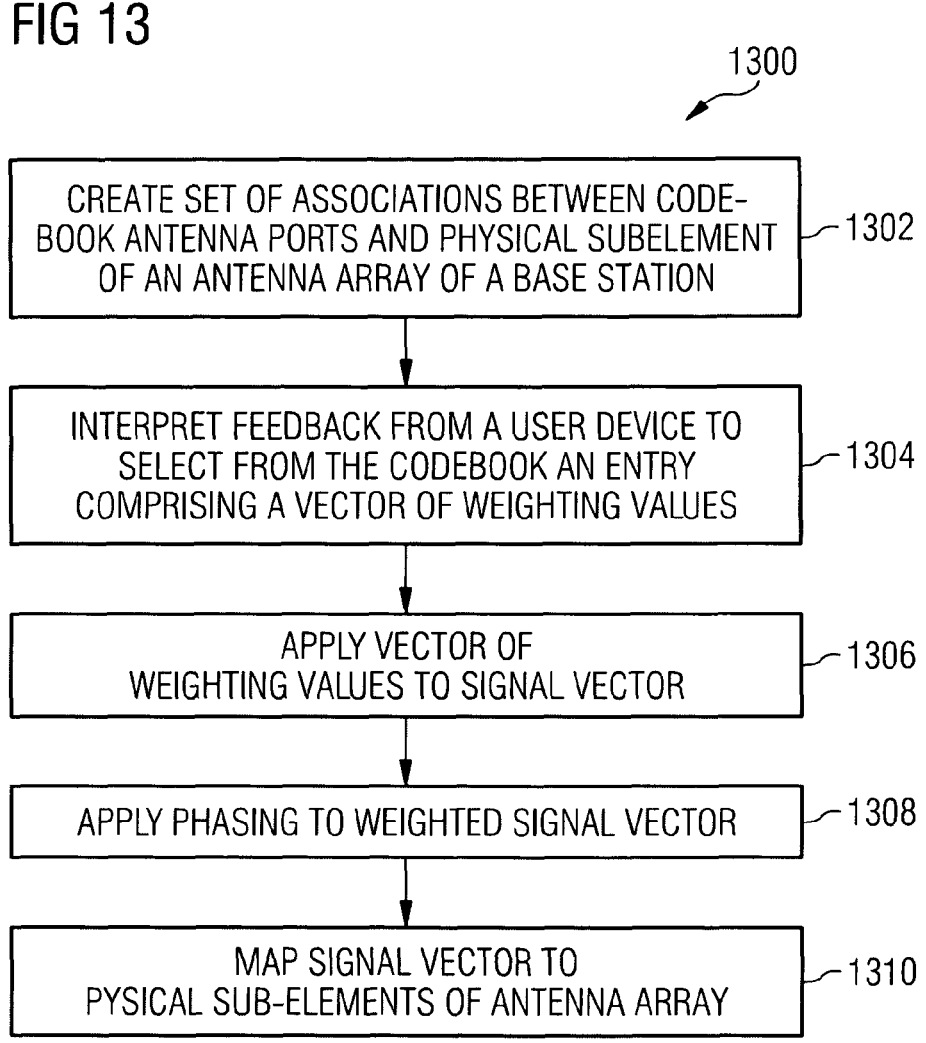
FIG. 13 illustrates a process according to an embodiment of the present invention.

FIG. 13 comprises a method 1300 according to an embodiment of the present invention. At step 1302, a set of associations is created between codebook antenna ports and physical sub-elements of an antenna array of a base station. Each of the set of associations is between an antenna port specified by a codebook accessible to the base station, and a physical sub-element of an antenna array of the base station. The physical sub-elements may suitably be arranged in cross-polarized pairs, and the pairs may be arranged according to azimuth and elevation. The codebook may suitably be an 8 transmit antenna LTE codebook. At step 1304, feedback information from a user device is interpreted to select from the codebook an entry comprising a vector of weighting values. Each of the weighting values suitably defines a relative weighting (which may be complex) for a signal component to be input to an antenna port specified by an entry of the codebook. At step 1306, the vector of weighting values is applied to a signal configured for transmission to a user device in the form of a signal vector comprising a vector of weighted signal components. At step 1308, a phasing value is applied to each of the weighted signal components, with the phasing values being determined so as to maximize the rank 1 or rank 2 performance of the codebook feedback with the particular RF beams used in the elevation dimension. At step 1310, each component of the vector of weighted signal components is mapped to a physical sub-element of the antenna array.

Figure 14A:
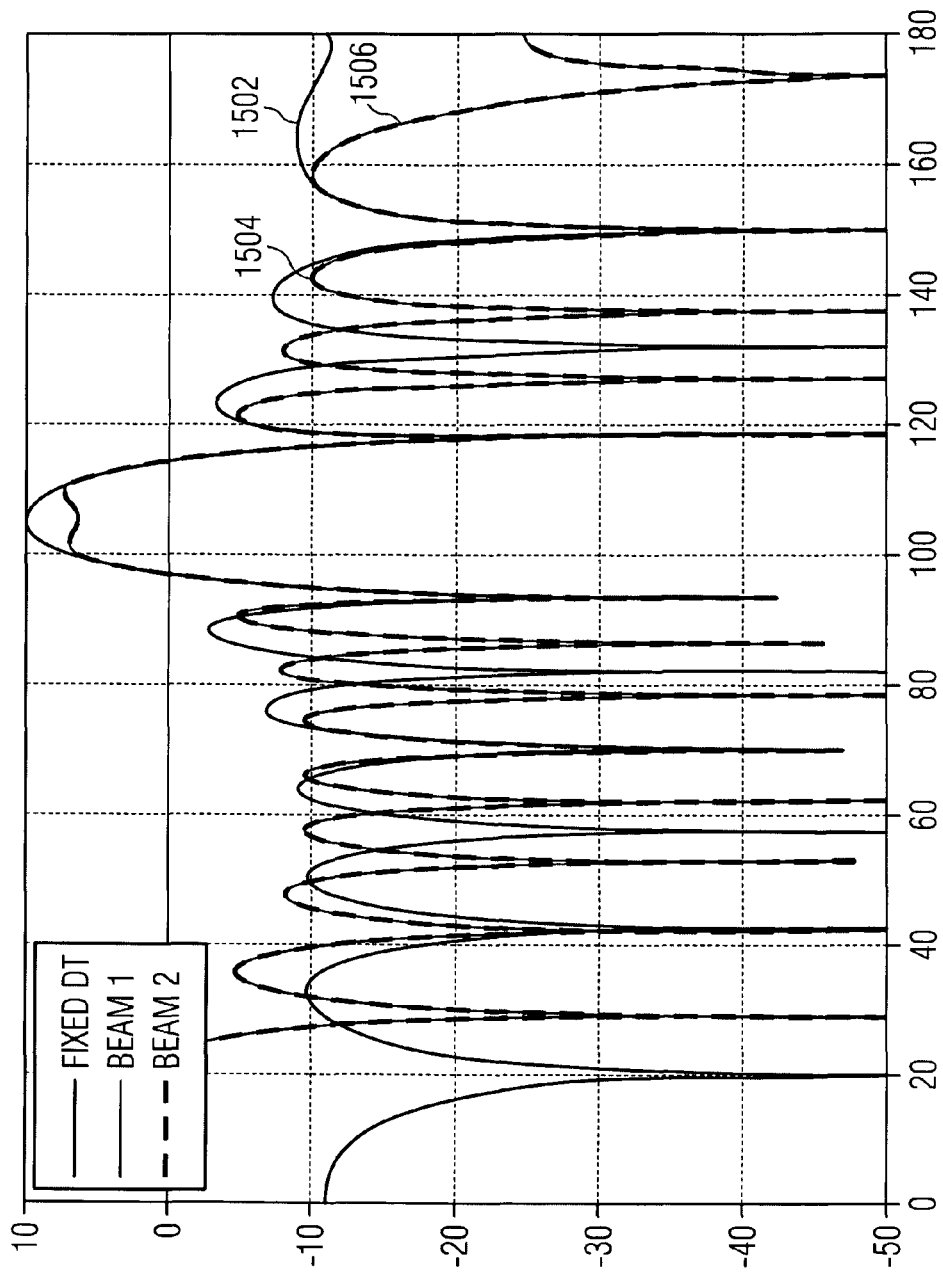
FIGS. 14A and 14B illustrate elevation beam patterns used in simulations which demonstrate the performance characteristics of a network configured according to embodiments of the present invention.
Figure 14B:
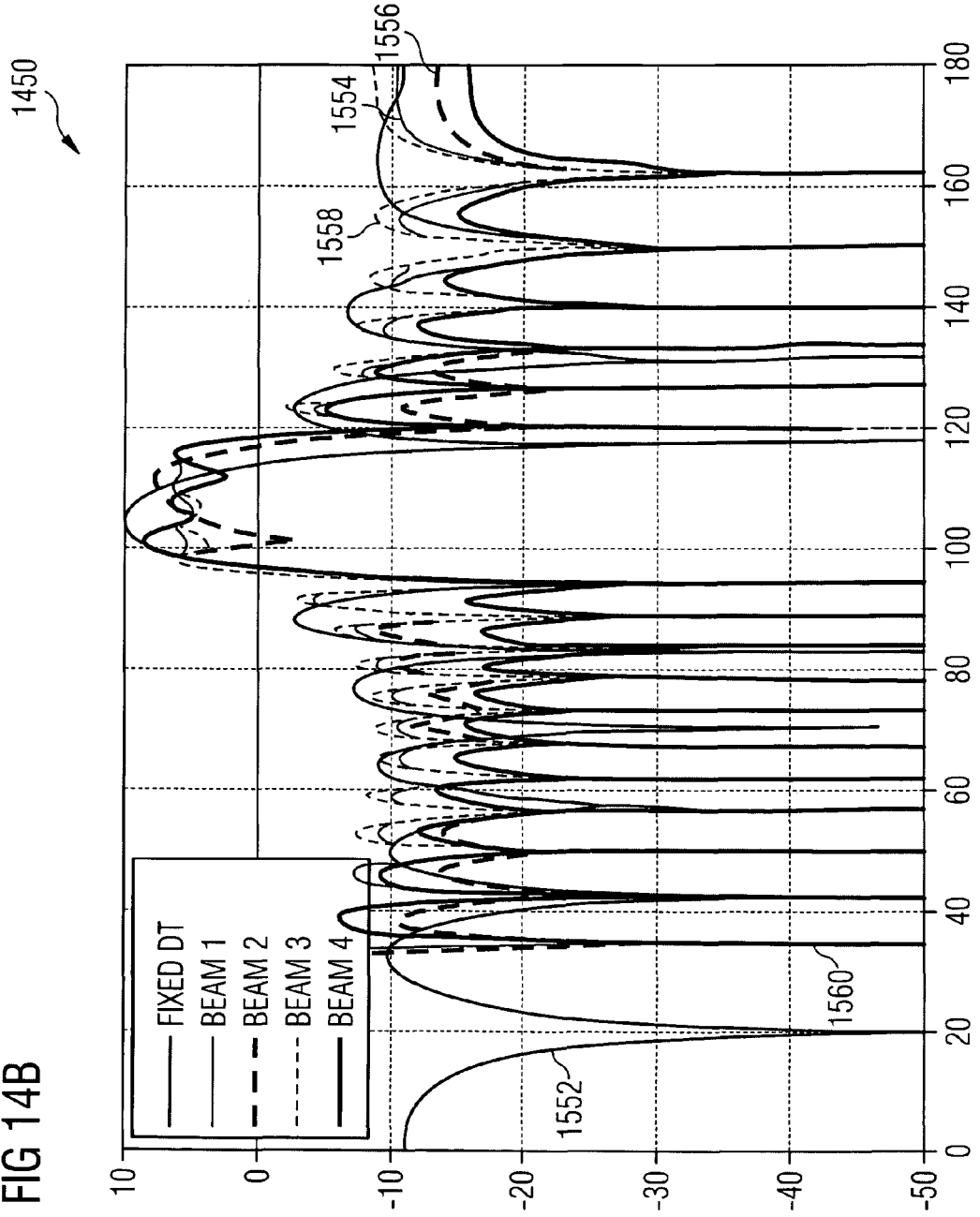

It can be shown that embodiments of the present invention can achieve significant throughput gains compared to prior-art approaches. FIGS. 14A and 14B illustrate elevation beams which were used to generate simulation results which employed an ITU urban macro (UMa) channel altered using an elevation spread decreasing with distance. The distance-dependent elevation spread was chosen using a ray tracer and explicit modeling of vertical elements was used. Link-level simulation disconnects users at varying distances from the base station, with all users having 10 dB C/I. FIG. 14A illustrates 2 elevation beams generated from an array with 10 vertical elements having a 0.75 lambda spacing in elevation. FIG. 14B illustrates 4 elevation beams generated from an array with 15 vertical elements having a 0.75 lambda spacing.

FIG. 14A illustrates a graph 1400 showing gain versus elevation angle curves 1502-1506 for a fixed downtilt, a first elevation beam, and a second elevation beam, respectively. FIG. 14B illustrates a graph 1450 showing gain versus elevation angle curves 1552-1560 for a fixed downtilt, a first elevation beam, a second elevation beam, a third elevation beam, and a fourth elevation beam, respectively.

Results of the simulation, in terms of rank 2 throughput, compared to prior-art mapping, are as follows:

| | |
|---|---|
| 2 elevation, 4 azimuth ports (prior art mapping) | 25.7 Mbps |
| 4 elevation, 2 azimuth ports (prior art mapping) | 28.6 Mbps |
| 2 elevation, 4 azimuth ports (configured as in FIG. 11A) with phasing as illustrated in FIG. 11B (this represents a 64% improvement over prior-art techniques) | 42.0 Mbps 42.1 Mbps |
| 2 elevation, 4 azimuth ports (configured as in FIG. 12A) with phasing as illustrated in FIG. 12B | 37.5 Mbps 42.2 Mbps |
| 4 elevation, 2 azimuth ports (configured as in FIG. 10A) with phasing as illustrated in FIG. 10B (this represents a 58% improvement over prior-art techniques) | 41.1 Mbps 45.2 Mbps |

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. A method comprising:
creating a set of associations between codebook antenna ports and physical sub-elements of an antenna array, wherein each of the set of associations associates an antenna port specified by a codebook accessible to a base station with one of a set of physical sub-elements of an antenna array of the base station, wherein the physical sub-elements are arranged in cross-polarized pairs, and wherein the pairs are arranged at least in according to elevation;
interpreting feedback information from a user device to select from the codebook an entry comprising a vector of weighting values, wherein each of the weighting values defines a relative weighting for a signal component to be input to an antenna port specified by an entry of the codebook;
applying the vector of weighting values to a signal configured for transmission to a user device to form a signal vector comprising a vector of weighted signal components; and
mapping each component of the vector of weighted signal components to a physical sub-element of the antenna array according to the set of associations.

2. The method of claim 1, wherein the code book is a long term evolution 8 transmit antenna codebook.

3. The method of claim 2, wherein the cross-polarized pairs are arranged to form an array of 8 sub elements consisting of four elevation by two azimuth sub elements.

4. The method of claim 3, wherein the set of associations maps the first four antenna ports defined by the codebook respectively to sub-elements of the antenna array at a first azimuth position, in descending order of elevation, and maps the last four antenna ports defined by the codebook to sub-elements of the antenna array at a second azimuth position, greater than the first azimuth position, in order of elevation.

5. The method of claim 4, wherein the order of elevation is ascending order of elevation.

6. The method of claim 4, wherein the order of elevation is descending order of elevation.

7. The method of claim 2, wherein the cross-polarized pairs are arranged to form an array of 8 sub elements consisting of two elevation by four azimuth sub elements.

8. The method of claim 7, wherein the set of associations respectively maps the first four antenna ports defined by the codebook to sub-elements forming two elevation sub elements in descending order on a first azimuth dimension and next the two elevation sub elements in descending order on a second azimuth dimension, and respectively maps the last four antenna ports defined by the codebook to sub elements forming two elevation sub elements in descending order on a third azimuth dimension and next two elevation sub elements in descending order on the fourth azimuth dimension.

9. The method of claim 7, wherein the set of associations respectively maps the first four antenna ports defined by the codebook to columns of sub-elements forming two azimuth sub elements in ascending order for a first elevation dimension on a first polarization and next two azimuth sub elements in ascending order for a second elevation dimension on the same polarization and maps the last four antenna ports defined by the codebook to sub elements forming two azimuth sub elements in ascending order for the first elevation dimension on a second polarization and next two azimuth sub elements in ascending order for a second elevation dimension on a second polarization.

10. The method of claim 1, further comprising applying a phasing value to each of the weighted signal components, wherein the phasing values are determined based on the particular RF beams used in the elevation dimension.

11. The method of claim 10, wherein the phasing values are determined based at least in part on maximization of rank 1 gain.

12. The method of claim 10, wherein the phasing values are determined based at least in part on maximization of rank 2 performance.

13. A method comprising:
determining a phasing value for each of a vector of signal components to be provided as inputs to an antenna array comprising a plurality of elevation ports, wherein the phasing values are determined based on the particular RF beams used in the elevation dimension; and
applying the phasing values to signal components corresponding to antenna ports defined by a codebook accessible to a base station.

14. The method of claim 13, wherein the codebook ports are mapped to physical sub-elements of an antenna array organized according to elevation and azimuth.

15. The method of claim 13, wherein the phasing values are determined based at least in part on maximization of rank 1 gain.

16. The method of claim 13, wherein the phasing values are determined based at least in part on maximization of rank 2 performance.

17. An apparatus comprising:
at least one processor;
memory storing computer program code;
wherein the memory storing the computer program code is configured to, with the at least one processor, cause the apparatus to at least:
create a set of associations between codebook antenna ports and physical sub-elements of an antenna array, wherein each of the set of associations associates an antenna port specified by a codebook accessible to a base station with one of a set of physical sub-elements of an antenna array of the base station, wherein the wherein the physical sub-elements are arranged in cross-polarized pairs, and wherein the pairs are arranged at least in part by elevation;
interpret feedback information from a user device to select from a codebook an entry comprising a vector of weighting values, wherein each of the weighting values defines a relative weighting for a signal component to be input to an antenna port specified by entry of the codebook;
apply the vector of weighting values to a signal configured for transmission to a user device to form a signal vector comprising a vector of weighted signal components; and
map each component of the vector of weighted signal components to a physical sub-element of the antenna array according to the set of associations.

18. The apparatus of claim 17, wherein the code book is a long term evolution 8 transmit antenna codebook.

19. The apparatus of claim 18, wherein the cross-polarized pairs are arranged to form an array of 8 sub elements consisting of four elevation by two azimuth sub elements.

20. The apparatus of claim 19, wherein the set of associations maps the first four antenna ports defined by the codebook respectively to sub-elements of the antenna array at a first azimuth position, in descending order of elevation, and maps the last four antenna ports defined by the codebook to sub-elements of the antenna array at a second azimuth position, greater than the first azimuth position, in descending order of elevation.

21. The apparatus of claim 18, wherein the cross-polarized pairs are arranged to form an array of 8 sub elements consisting of two elevation by four azimuth sub elements.

* * * * *